US011163484B1

(12) United States Patent
Kaitchuck et al.

(10) Patent No.: US 11,163,484 B1
(45) Date of Patent: Nov. 2, 2021

(54) REPORTING TIME PROGRESS ON EVENTS WRITTEN TO A STREAM STORAGE SYSTEM

(71) Applicant: EMC IP Holding Company LLC, Hopkinton, MA (US)

(72) Inventors: Tom Kaitchuck, Portland, OR (US); Shivesh Ranjan, Pune (IN); Flavio Junqueira, Barcelona (ES)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/884,647

(22) Filed: May 27, 2020

(51) Int. Cl.
*G06F 3/06* (2006.01)

(52) U.S. Cl.
CPC .......... *G06F 3/0653* (2013.01); *G06F 3/0604* (2013.01); *G06F 3/0659* (2013.01); *G06F 3/0673* (2013.01)

(58) Field of Classification Search
CPC ............................................... G06F 3/06–0689
See application file for complete search history.

(56) References Cited

U.S. PATENT DOCUMENTS

| | | | |
|---|---|---|---|
| 8,572,091 B1 | 10/2013 | Sivasubramanian et al. | |
| 8,825,848 B1 * | 9/2014 | Dotan | G06F 16/1734 709/224 |
| 9,514,018 B2 | 12/2016 | Sikri | |
| 9,898,482 B1 * | 2/2018 | Bono | G06F 16/182 |
| 9,965,215 B1 * | 5/2018 | Vazhenin | G06F 3/065 |
| 11,016,826 B2 | 5/2021 | Lehmann | |
| 2011/0131588 A1 | 6/2011 | Allam et al. | |
| 2012/0102503 A1 | 4/2012 | Meijer et al. | |
| 2013/0226931 A1 | 8/2013 | Hazel et al. | |
| 2015/0169449 A1 * | 6/2015 | Barrell | G06F 12/0806 711/143 |
| 2015/0172120 A1 * | 6/2015 | Dwarampudi | G06F 3/061 709/221 |
| 2015/0363245 A1 | 12/2015 | Mutschler | |
| 2017/0075832 A1 * | 3/2017 | Bhimani | G06F 3/0688 |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Nicholas J Simonetti
(74) *Attorney, Agent, or Firm* — Amin, Turocy & Watson, LLP

(57) ABSTRACT

Reporting time progress for written events on a stream is disclosed. The system comprises operations for obtaining time report information comprising respective timestamp information and respective positional offset information for respective writers with respect to events written to a stream by the respective writers. The operations further comprise aggregating the time report information and determining a lowerbound, e.g., a minimum timestamp before which new events to be written by the stream storage system will no longer arrive, and determining an upperbound, e.g., a stream offset representative of an overall offset of the events written thus far in the stream. The operations further comprise storing the minimum timestamp and the stream offset in a data structure for the events written thus far.

20 Claims, 10 Drawing Sheets

(56) References Cited

U.S. PATENT DOCUMENTS

| | | | |
|---|---|---|---|
| 2017/0075947 A1 | 3/2017 | Kurilov et al. | |
| 2017/0212891 A1 | 7/2017 | Pundir et al. | |
| 2018/0121307 A1* | 5/2018 | Braun | G06F 16/13 |
| 2018/0332366 A1 | 11/2018 | Paduroiu | |
| 2018/0332367 A1* | 11/2018 | Kaitchuck | H04L 65/60 |
| 2019/0026301 A1 | 1/2019 | Wang et al. | |
| 2020/0174695 A1* | 6/2020 | Bazarsky | G06F 3/061 |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Akidau et al., "MillWheel: Fault-Tolerant Stream Processing at Internet Scale" Very Large Data Bases (2013), pp. 734-746.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8 (2015), pp. 1792-1803.

Office Action dated Jan. 29, 2021 for U.S. Appl. No. 16/256,083, 42 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

* cited by examiner

REPORTING TIME PROGRESS ON EVENTS WRITTEN TO A STREAM STORAGE SYSTEM

TECHNICAL FIELD

The disclosed subject matter relates to data stream processing and, more particularly, to reporting time progress from multiple writers for unbounded data, representing events from multiple sources, received and stored by a stream storage system.

BACKGROUND

Stream data applications process data from sources that can independently generate events and at different times. Such sources, for example, can include social media networks, online retailer applications, streaming websites, financial data applications, Internet of Things (IoT) devices, edge computing devices, and so on. Stream data applications typically utilize storage systems such as stream storage systems, since data representing events in the system can be received and stored independent of the reading or the processing of the data, and further can be written by different writers of the system at different writing rates, as well as read by different readers at different reading rates. In this regard, by decoupling the data source and processing component using a stream store, the data source and processing components are permitted to proceed at different rates, making how, when, and how fast data events are generated and stored to be generally free from constraints relating to how, when and how fast events can be read and processed, and vice versa.

However, given the unbounded nature of the events originating across different sources and written by different writers, as decoupled from any processing of those events, how time is tracked in such a system is relevant to making sure the reader applications can make some temporal assumptions about what they are reading. Conventional systems, however, are inadequate in addressing this fully for a generalized stream storage system, as described herein and below.

The above-described background relating to stream processing is merely intended to provide a contextual overview of some issues and is not intended to be exhaustive. Other contextual information may become apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems, methods, computer readable media, etc. disclosed herein relate to reporting time progress for a stream. In one example embodiment, a system comprises a processor and a memory that stores executable instructions that, when executed by the processor, facilitate performance of operations. The operations comprise obtaining, from respective writers that have written events received thus far to a stream of a stream storage system, respective time report information comprising respective timestamp information and respective positional offset information for the respective writers with respect to the events written to the stream by the respective writers. The operations further comprise aggregating the time report information obtained from the respective writers, resulting in aggregated timestamp information and aggregated positional offset information. The operations further comprise determining a minimum timestamp before which new events to be written by the stream storage system will no longer arrive, based on the aggregated timestamp information. The operations further comprise determining a stream offset representative of an overall offset of the events written thus far in the stream, based on the aggregated positional offset information. The operations further comprise storing the minimum timestamp and the stream offset in a data structure for the events written thus far.

Another example embodiment relates to a system that comprises a processor and a memory that stores executable instructions that, when executed by the processor, facilitate performance of operations. The operations comprise reading, from a data structure that was created based on aggregation of information relating to events written to a stream storage system thus far by a group of writers, a minimum timestamp and a stream offset for the events written thus far. The operations further comprise determining, with respect to a temporal function associated with a process to be applied to a group of the events by an application, whether no more new events received by the stream storage system will arrive in the future that satisfy the temporal function, based on the minimum timestamp and the stream offset for the events written thus far. The operations further comprise, based on a determination that no more new events will arrive in the future that satisfy the temporal function with respect to the minimum timestamp and the stream offset, applying the process to the group of the events that satisfy the temporal function.

Another example embodiment relates to a system that comprises a processor and a memory that stores executable instructions that, when executed by the processor, facilitate performance of operations. The operations comprise generating, using respective writers that have written events received by the system thus far to a stream of a stream storage system, respective time report information for the events comprising respective timestamp information and respective positional offset information for the respective writers with respect to the events written to the stream by the respective writers, wherein the stream supports dynamic scaling by being able to modify at least one storage unit of the stream while events are processed by the respective writers. The operations further comprise reporting the time report information from the respective writers for aggregation of the time report information, resulting in aggregated timestamp information and aggregated positional offset information, based on which the system is able to determine a minimum timestamp before which new events to be written by the stream storage system will no longer arrive.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
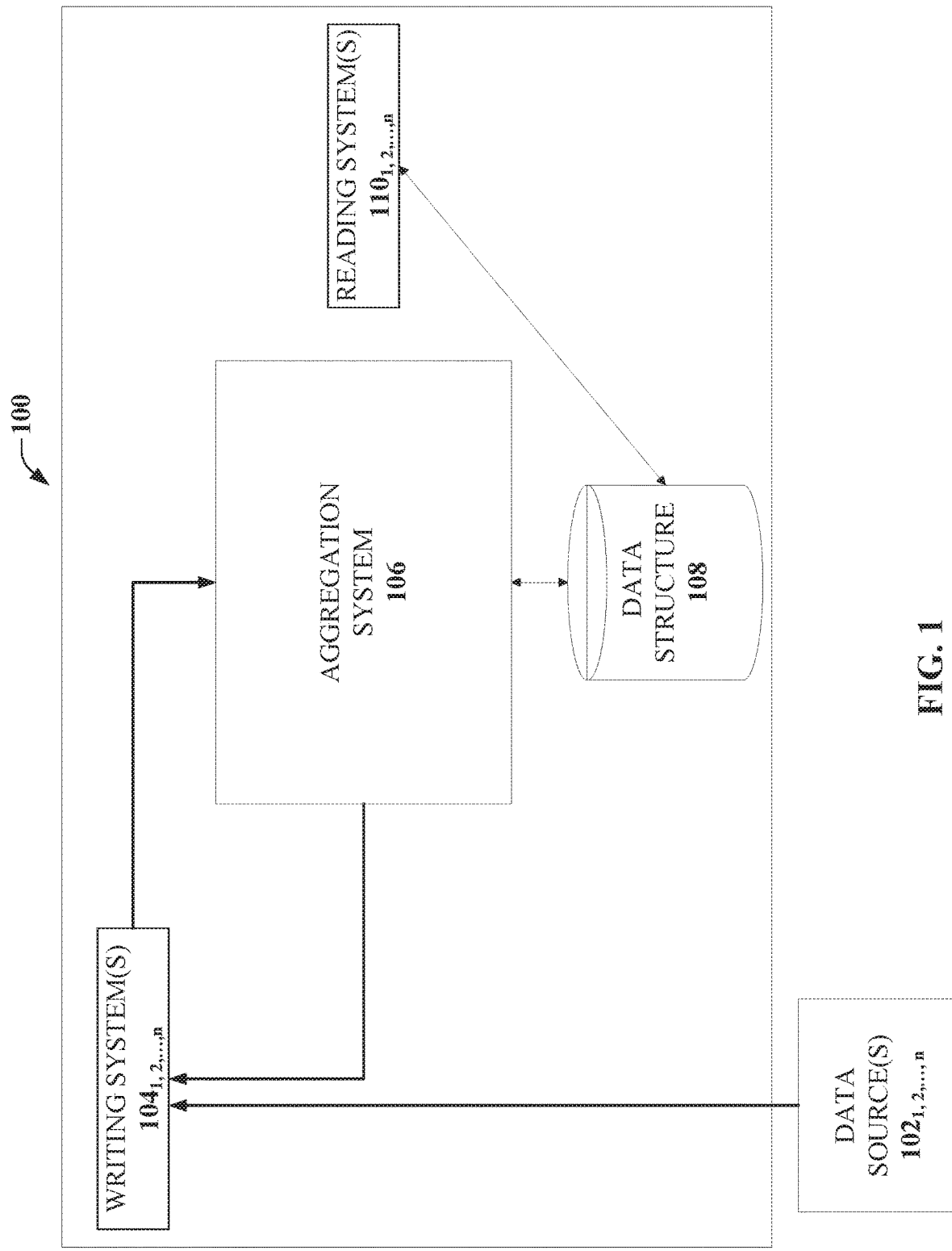
FIG. 1 illustrates a block diagram of an example, non-limiting system facilitating time reporting of data events written to a stream and aggregating those time reports for readers to access in accordance with one or more embodiments described herein.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As mentioned in the background, given the unbounded nature of the events originating across different sources and written by different writers, and independent processing/reading thereof by different readers, the readers should have some sense of time relativity for the events generally to have some minimal guarantees about where in time events are being received, or committed, by different writers. In this regard, as mentioned in the background, conventional technology faces some challenges when processing data in a stream storage system accurately and for the general case. In more detail, because a stream can accept parallel writes, e.g., when configured with multiple segments, this can lead to multiple writers writing events and reporting time progress. In addition, because readers of a stream can read from segments in parallel, time order is not guaranteed to be preserved when reading. Furthermore, segments of a stream can be reassigned across readers to balance the load, which can potentially bring a reader to an earlier time. Finally, streams can auto-scale, leading to dynamic changes to the stream, such as dynamic changes to the number of segments of a stream. For example, the number of segments of a stream can be dynamic based on factors such as ingestion rate of events, etc. As mentioned, conventional technology does not adequately or generally address each of these cases.

Accordingly, various embodiments described herein provide support for tracking time progress and generation of correct low watermarks as multiple writers in parallel write events onto a data stream, as well as support for multiple readers in parallel accessing those written events in a specified timeframe. In the context of a stream storage system, initially it is noted that a low watermark is a position P and a timestamp T, such that all events prior to position P in the stream have a corresponding timestamp T'<=T, and further such that no event after position P in the stream has a timestamp T"<=T. Further, it is noted that one or more data storage units can be used to represent a stream, which can be statically defined, or in some systems, can be dynamically defined as events are written. In one non-limiting, example implementation, the one or more data storage units comprise segment(s) of a stream, and the segment(s) can be dynamic segments of a stream as part of tracking the time progress.

To elaborate, to properly process stream data with temporal assurances, in various embodiments herein, time progress reports, reported by writers of the stream storage system, are aggregated, and the aggregated information is updated as updated time progress reports are reported by the writers. The aggregated information is made accessible, or otherwise provided, to readers of the system. To compute the number of events at a given frequency of time that meet a given criterion, a data processing component, e.g., a reader application, will request to know the event times to assign events to timeframes, as well as will determine that the data processing component has received all events for a given timeframe. That way, the data processing component can evaluate the data with a high confidence as of some reference point in time.

A concept often used in stream processing to advance time progress is low watermarks. A low watermark is a control event [c] containing a positional offset [p] and a time [t] indicating that all events with time [t'<=t] have already been received, and that no event after event [c] has a timestamp [t"<=t]. Applications indicate progress when writing events into the stream, the stream stores process the data to reveal time progress, and applications read that time progress, thereby enabling applications to implement the low watermarks. For instance, if the applications want to know all the sales data events from the last hour, e.g., to total all of the sales events on an hourly basis, then the time progress report is consulted as described herein. The time progress report is consulted to understand whether all events currently received by the system are being received after the last hour for all writers, and, if so, the applications can proceed to process all of the sales data events from the last hour knowing that all of the sales data events have been received for the last hour.

For some further context, a stream storage system is a system designed to store continuously generated data. The primitive that the stream storage system exposes for storing data is a stream, comprising segments. Generally, applications of stream storage systems ingest data events by writing to a stream and consume the data events by reading from the stream. A stream can comprise a set of parallel append only segments that can change over time. Such changes to the number of segments are induced by fluctuations to the incoming workload. For example, the segments of the stream can be assigned key ranges, satisfying the following: the union of all the key ranges must cover the interval of real numbers between 0.0 and 1.0, and no two intervals overlap. Each written event is associated with a routing key, which the stream storage system uses to the event to a segment when writing the event to the stream. Data occurring in the event often produces the routing key and can be a customer ID, machine ID, or a string. Routing keys can be hashed to form a key space, and the key space is then divided into multiple partitions that correspond to the number of stream segments. Events are assigned to stream segments through consistent hashing. Although a stream can be composed of segments, a stream can be composed of other formats and attributes that can be utilized in one or embodiments.

These and other embodiments or implementations are described in more detail below with reference to the drawings. Repetitive description of like elements employed in the figures and other embodiments described herein is omitted for sake of brevity.

FIG. 1 illustrates a non-limiting example of a system 100 that comprises an aggregation system 106 for collecting respective time report information from one or more writing systems $104_1, 104_2, \ldots, 104_n$. The one or more writing systems $104_1, 104_2, \ldots, 104_n$ are communicatively connected to one or more data sources $102_1, 102_2, \ldots, 102_n$ to receive event data therefrom. In addition, the aggregation system 106 can generate a data structure 108, which is representative of the latest, respective time report information, as aggregated for the one or more writing systems $104_1$, $104_2$, ..., $104_n$. Data structure 108 is made accessible, or can be sent, to one or more reading systems $110_1$, $110_2$, ..., $110_n$ for usage by the one or more reading systems $110_1$, $110_2$, ..., $110_n$ in determining where respective events written by the one or more writing systems $104_1$, $104_2$, ..., $104_n$ have been written as part of receiving a temporal guarantee.

Still referring to FIG. 1, in one or more embodiments, one or more writing systems $104_1$, $104_2$, ..., $104_n$ write event data, received from the one or more data sources $102_1$, $102_2$, ..., $102_n$, to a stream, such as segments of a stream. In this regard, the one or more writing systems $104_1$, $104_2$, ..., $104_n$ write respective events to assigned segments of the stream and generate time report information for each event written by the one or more writing systems $104_1$, $104_2$, ..., $104_n$. For example, the respective time report information for respective events comprises respective timestamps and respective positional offsets for the one or more writing systems $104_1$, $104_2$, ..., $104_n$ associated with where and when their respective events are being written to the segments of the stream. In one or more embodiments, the one or more writing systems $104_1$, $104_2$, ..., $104_n$ can write a group of events periodically according to a defined periodicity and generate time report information for the group of events written in periodic intervals. For example, instead of generating time report information for each event written to the stream, time report information can be generated whenever X events have been written, where X>1. For another example, a writer could note time every 30 seconds and generate corresponding time report information for the events written in the past 30 seconds. Once the respective time report information is generated, the one or more writing systems $104_1$, $104_2$, ..., $104_n$ report the respective time report information to the aggregation system 106.

Still referring to FIG. 1, as aggregation system 106 receives time report information reported by the one or more writing systems $104_1$, $104_2$, ..., $104_n$, the aggregation system 106 aggregates the time report information into an aggregated data set comprising aggregated timestamp information and aggregated positional offset information. Next, the aggregation system 106 determines a minimum timestamp based on the aggregated timestamp information. The determined minimum timestamp is representative of a value before which new events to be written by the stream storage system will no longer arrive. The aggregation system 106 also determines a stream offset based on the aggregated positional offset information. The stream offset represents an overall offset of the events written thus far in the stream. After determining the minimum timestamp and the stream offset, the aggregation system 106 can store the minimum timestamp and the stream offset for the events written thus far in data structure 108. The data structure 108 is updated by the aggregation system 106 when a writer of the one or more writing systems $104_1$, $104_2$, ..., $104_n$ updates the time report information and sends the updated time report information for the writer to the aggregation system 106, and thus the data structure 108 is kept current for the one or more writing systems $104_1$, $104_2$, ..., $104_n$.

Still referring to FIG. 1, after aggregation system 106 aggregates the time report information, determines the minimum timestamp and the stream offset, and stores the minimum timestamp and the stream offset in the data structure 108, one or more reading systems $110_1$, $110_2$, ..., $110_n$ can read or obtain the data structure 108 to access the generated minimum timestamp and the stream offset. Through reading the minimum timestamp and the stream offset, the one or more reading systems $110_1$, $110_2$, ..., $110_n$ can determine whether no more new events received by a stream storage system will arrive in the future that satisfy a temporal function associated with, e.g., an operational process applied to a specified group of events by an application or other component.

The temporal function evaluates to a Boolean value that uses a timestamp window. The timestamp window can be represented by an upperbound value and a lowerbound value. In one or more embodiments, the upperbound value and the lowerbound value can be stored in the data structure 108. The upperbound value can be a first timestamp that is greater than or equal to a respective timestamp of a group of respective timestamps recorded by a group of respective writers that is prior to a respective current timestamp for a current respective stream offset. The lowerbound value can be a second timestamp that is less than or equal to the respective current timestamp for the current respective stream offset. Once the one or more reading systems $110_1$, $110_2$, ..., $110_n$ determines that no more new events will arrive in the future that satisfy the temporal function, the one or more reading systems $110_1$, $110_2$, ..., $110_n$ apply the operational process to the group of events that satisfy the temporal function. In one or more embodiments, the lowerbound value can be based on the stream offset, such that the stream offset acts as an upperbound position.

Figure 2:
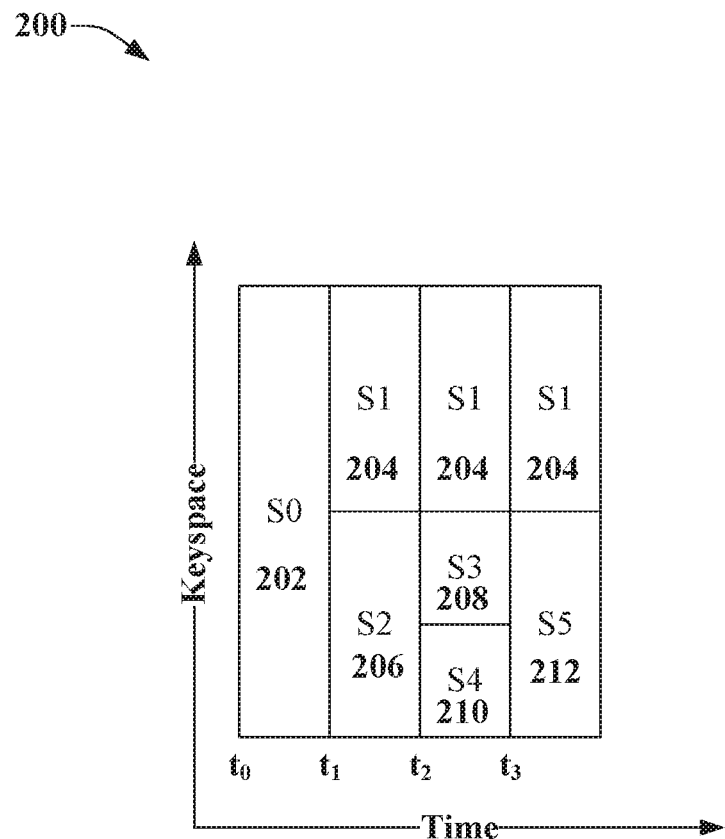
FIG. 2 illustrates a block diagram of an example, non-limiting system facilitating auto-scaling of a stream in accordance with one or more embodiments described herein.

FIG. 2 illustrates a non-limiting example of a scaling process 200 for segments of streams in accordance with optional aspects and embodiments of the subject disclosure. For an example of dynamic scaling, a stream containing segment S0 202 is present at time $t_0$. Between $t_0$ and $t_1$, when there is an increase in a rate of events written to segment S0 202, the system splits segment S0 202, resulting in newly formed segments S1 204 and S2 206 at $t_1$, also called a scale-up event. Between $t_1$ and $t_2$, when there is an increase in the rate of events written to segment S2 206, the system splits segment S2 206, resulting in newly formed segments S3 208 and S4 210 at $t_2$. Between $t_2$ and $t_3$, when there is a decrease in the rate of events written to segments S3 208 and/or S4 210, the system removes a segment from the group of segments by merging segments S3 208 and S4 210, resulting in newly formed segment S5 212 at $t_3$, also called a scale-down event.

The decision to scale an individual segment up or down can depend on a recent history of a segment, or a state of neighboring segments in a key interval for mergers. Segments can periodically or otherwise regularly report the amount of traffic the segments are receiving and are considered for scaling accordingly. Once there is a decision by the stream storage system to scale the segments of the stream, the stream storage system can, for example, seal (no further writes are accepted) the segments that are being called and create new segments accordingly. In this regard, the time report techniques described herein are robust when the number of segments changes, i.e., the timestamp assignment to events and time reports for each writer are maintained.

Figure 3:
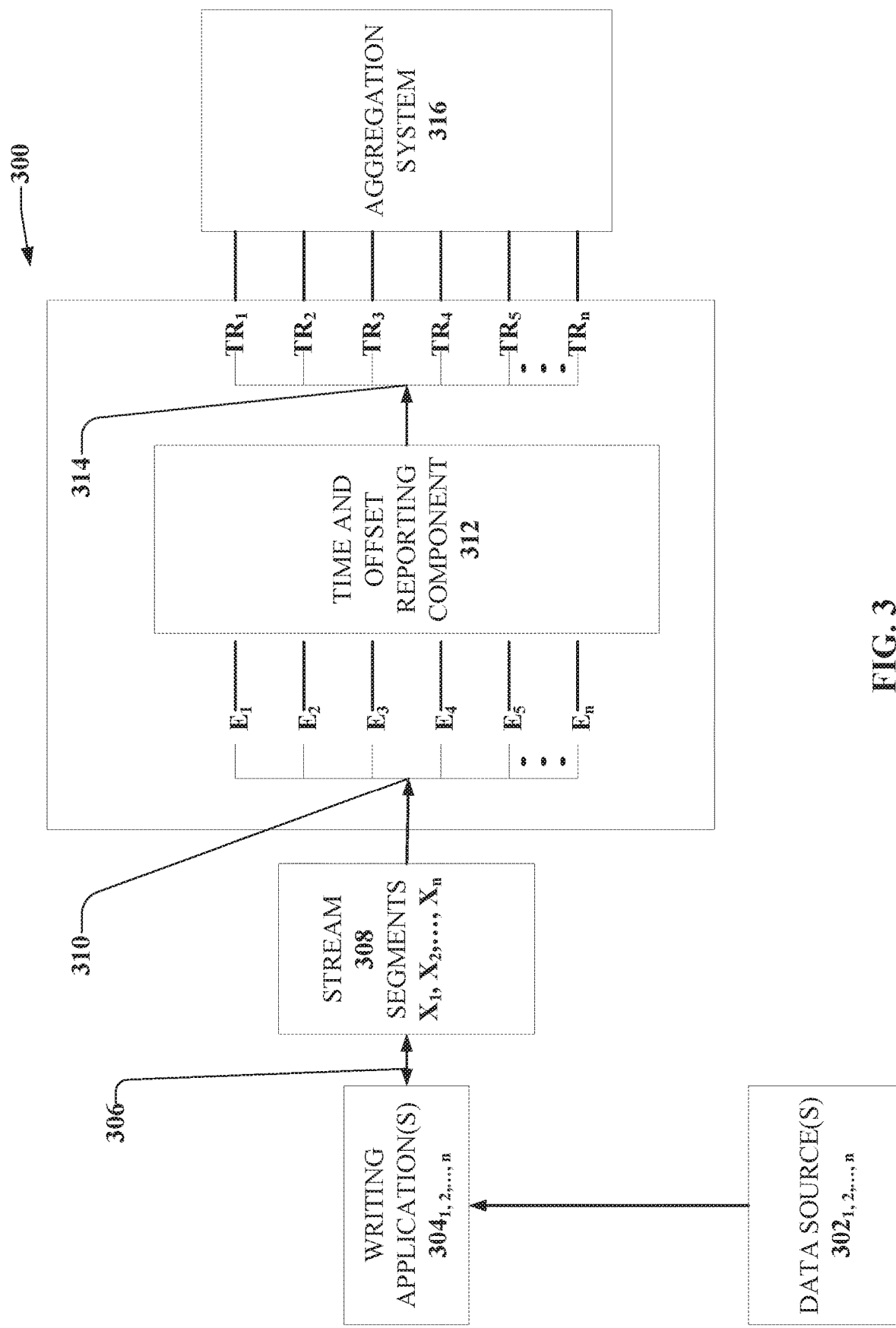
FIG. 3 illustrates a block diagram of an example, non-limiting system facilitating writing data events to a stream in parallel and reporting time progress in accordance with one or more embodiments described herein.

FIG. 3 illustrates a non-limiting example system 300 for writing events to a stream and accounting for the time report information corresponding to the written events. System 300 can comprise one or more writing applications $304_1$, $304_2$, ..., $304_n$. The one or more writing applications $304_1$, $304_2$, ..., $304_n$ can communicatively connect to one or more data sources $302_1$, $302_2$, ..., $302_n$ to receive event data therefrom. The event data is represented in a stream 308, which can comprise one or more segments $X_1, X_2, \ldots, X_n$, onto which events are written at rates 306 by different writers of the one or more writing applications 304$_1$, 304$_2$, ..., 304$_n$. For instance, a rate [Z] of the rates 306 can signify a current rate of events (or bytes) written to a segment of a stream. System 300 can further comprise a time and offset reporting component 312 that assigns time reports to written events 310 to generate time report information 314 represented by $TR_1, TR_2, \ldots, TR_n$. Further, aggregation system 316 receives the time report information 314 from the time and offset reporting component 312 in order to aggregate the time report information.

Still referring to FIG. 3, as mentioned, one or more writing applications 304$_1$, 304$_2$, ..., 304$_n$ write the event data, received from one or more data sources 302$_1$, 302$_2$, ..., 302$_n$, to segments of a stream. The one or more data sources 302$_1$, 302$_2$, ..., 302$_n$ can be different sources that send items of unbounded data for event writing. The one or more writing applications 304$_1$, 304$_2$, ..., 304$_n$ then write their respective events onto assigned segments $X_1, X_2, \ldots, X_n$ of stream 308, generating respective written events 310 that comprise $E_1, E_2, \ldots, E_n$. Events are written to the segments $X_1, X_2, \ldots, X_n$ at different rates 306 by different writers of the one or more writing applications 304$_1$, 304$_2$, ..., 304$_n$, which can increase or decrease depending on how many writing operations take place on the segments $X_1, X_2, \ldots, X_n$ of the stream 308.

In one or more embodiments, as events are written, a scaling criterion operation can be applied to the segments $X_1, X_2, \ldots, X_n$. The scaling criterion can comprise changing the number of segments as a function of a rate of the rates 306 being compared to a defined threshold rate of writing events to a segment of a stream. If the rate of the rates 306 increases to the point of exceeding the defined threshold rate, segments of the stream 308 being written at the rate can split one segment into multiple segments, whereas if the rate of the rates 306 decreases and falls below the defined threshold rate, stream 308 merge segments to accommodate the decrease in the load of data on the stream 308. Since a stream comprises unbounded data, the segments of the stream can be scaled in accordance to the amount of data received through writing operations. In one or more embodiments, the scaling need not be applied to the stream on an aggregate segment basis, rather the scaling criterion can comprise changing the number of segments on a per segment basis, i.e., evaluating local conditions for each segment and determining whether to change the segment by splitting, merging, locking, etc. In one or more embodiments, the one or more writing applications 304$_1$, 304$_2$, ..., 304$_n$ can update the segments by writing additional events to the assigned segments $X_1, X_2, \ldots, X_n$, thereby updating any information associated with the segments.

Still referring to FIG. 3, respective written events 310 are accessible to a time and offset reporting component 312, which assigns respective values to the respective written events 310 written by the one or more writing applications 304$_1$, 304$_2$, ..., 304$_n$, to produce respective time report information 314, represented in FIG. 3 as $TR_1, TR_2, \ldots, TR_n$. The respective time report information 314 comprises a respective timestamp and a respective positional offset for each event of the respective written events 310. In one or more embodiments, the time report information 314 can be updated by the one or more writing applications 304$_1$, 304$_2$, ..., 304$_n$ as additional events are written to the assigned segments $X_1, X_2, \ldots, X_3$.

In one example embodiment, the timestamps can denote notions of time, called event timestamps, at which the one or more writing applications 304$_1$, 304$_2$, ..., 304$_n$ report their time progress as they write their respective events to a stream. Event timestamps can be explicitly provided to the one or more writing applications 304$_1$, 304$_2$, ..., 304$_n$ by sources of data such as the one or more data sources 302$_1$, 302$_2$, ..., 302$_n$. The event timestamp for an event provided by a data source of the one or more data sources 302$_1$, 302$_2$, ..., 302$_n$ can be when the event is generated by the data source, or a time of sending the event to a corresponding writer, or can be another temporal moment defined by the data source.

In another example embodiment, where the one or more data sources 302$_1$, 302$_2$, ..., 302$_n$ do not explicitly provide timestamp information, the system 300 can assign respective timestamps, called ingestion timestamps, to the respective events based on when the respective events are written or ingested to the segments at respective points in time. In one embodiment, the ingestion timestamp can represent when the event is committed to storage by system 300, or similarly, where writers are generating the ingestion timestamps, the ingestion timestamp can represent when a writer for an event has received confirmation of committal to storage. In addition to timestamp information relating to the events, the time report information further comprises, for each event, a respective positional offset indicating a respective position in a segment of a writer of the one or more writing applications 304$_1$, 304$_2$, ..., 304$_n$ that is writing the event to the segment. Still referring to FIG. 3, as the respective time report information 314 is generated, the aggregation system 316 receives reports of the respective time report information 314 to perform aggregation thereof.

Figure 4:
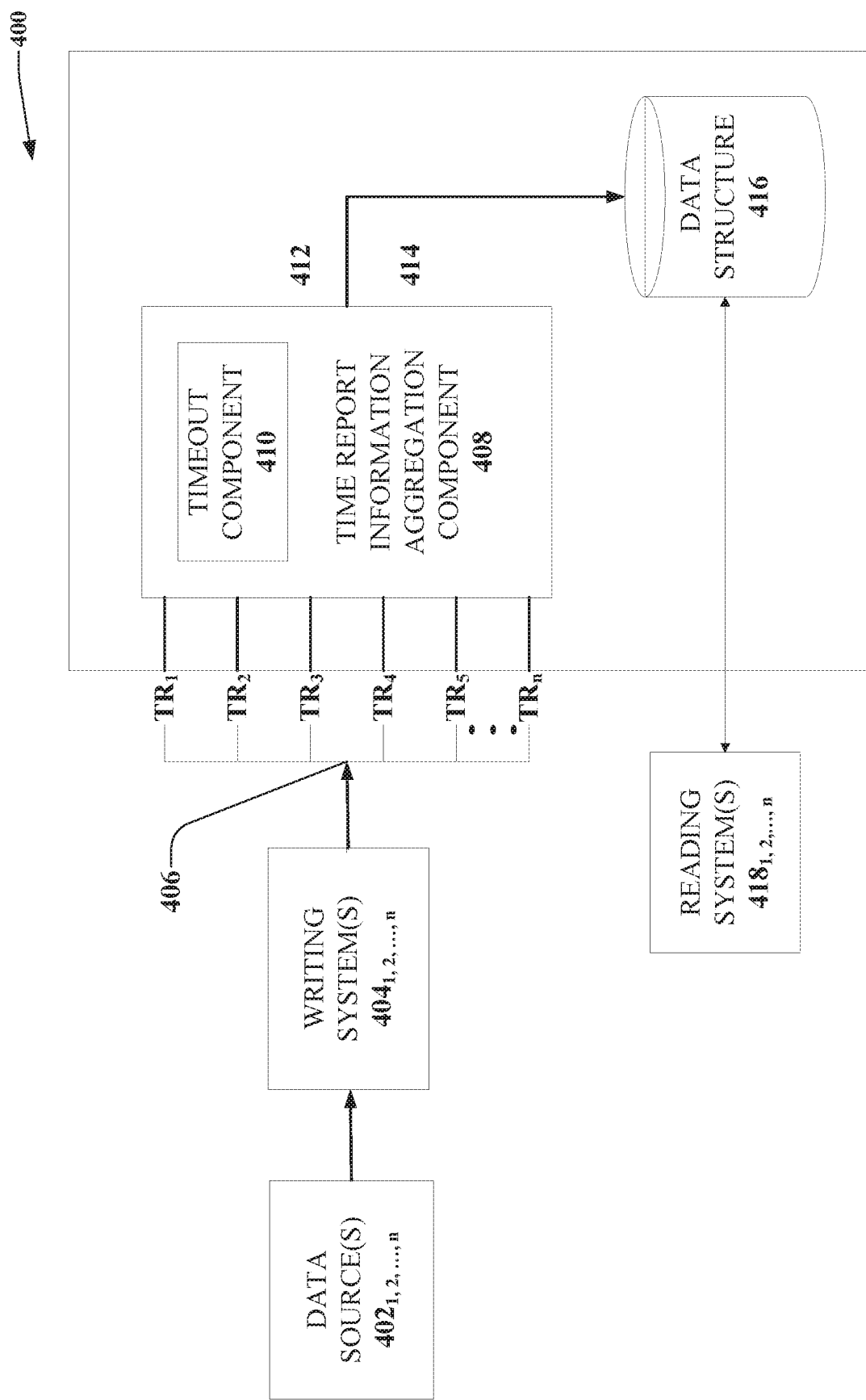
FIG. 4 illustrates a block diagram of an example, non-limiting system facilitating aggregating time report progress to determine specific parameters in accordance with one or more embodiments described herein.

FIG. 4 illustrates a non-limiting, example system 400 for aggregating received time report information and determining a minimum timestamp and a stream offset based on the aggregated time report information. Similar to other figures, system 400 can comprise one or more writing systems 404$_1$, 404$_2$, ..., 404$_n$, which can receive event data from one or more data sources 402$_1$, 402$_2$, ..., 402$_n$, and system 400 can comprise a time report information aggregation component 408. The time report information aggregation component 408 can comprise a timeout component 410. As described, the system 400 can generate a data structure 416 representative of a minimum timestamp value 412 and a stream offset value 414, and the data structure 416 is kept current as the one or more writing systems 404$_1$, 404$_2$, ..., 404$_n$ update the time report information and send the updated time report information to the system 400. Further, the system 400 can communicatively connect to one or more reading systems 418$_1$, 418$_2$, ..., 418$_n$, which can access the data structure 416 and read the minimum timestamp 412 and the stream offset 414 for the events written to the applicable stream thus far.

Still referring to FIG. 4, the time report information aggregation component 408 receives respective time report information 406, represented by $TR_1, TR_2, \ldots, TR_n$ for respective events generated by the one or more writing systems 404$_1$, 404$_2$, ..., 404$_n$. In one or more embodiments, the respective time report information 406 can comprise a respective timestamp and a respective positional offset for each of the respective events. As mentioned earlier, the timestamp can be provided explicitly as a respective event timestamp, or a respective ingestion timestamp can be assigned as an alternative, e.g., where the data source(s) are not providing the timestamp. Once received, the time report information aggregation component 408 aggregates the respective time report information 406 and determines a minimum timestamp value 412 representing a minimum, or lowerbound, timestamp and a stream offset value 414 representing a stream offset, or upperbound position. More generally, the time report information aggregation component 408 aggregates the respective time report information 406 and determines a lowerbound timestamp and an upperbound position in the stream. Thus, in an example, the stream offset value 414 can serve as an upperbound position for the lowerbound, or minimum, timestamp. The minimum timestamp, such as the minimum timestamp value 412, denotes, or is a function of, a minimum point in time present in the respective timestamps of the respective events written to the segments. The stream offset, such as the stream offset value 414, denotes, or is a function of, a maximum positional offset present in the respective positional offsets of the respective writers of the respective events written to the segments. By aggregating the respective time report information and determining the minimum timestamp value and the stream offset, this guarantees that any reading platform whose position is above the stream offset will have received all events thus far.

As noted above, the time report information aggregation component 408 can further optionally comprise a timeout component 410, which applies a timeout condition. In this regard, there are times when a writer or a group of writers of the one or more writing systems $404_1, 404_2, \ldots, 404_n$ have not yet reported their respective time report information due to various circumstances, such as, but not limited to, a system crash on the writer's side or inactivity. To account for those situations, the timeout component 410 can allot an amount of time for the time report information aggregation component 408 to wait for any inactive or missing respective writers to report their respective time report information and be included in the aggregation. If the allotted time passes, the time report information aggregation component 408 can exclude the writer or the group of writers, from the aggregation process, that have failed to report their respective time report information. As a result, the writer or the group of writers that have been excluded will have to wait for a subsequent aggregation process to report and be represented in the aggregation result.

Still referring to FIG. 4, at each aggregation cycle, after the minimum timestamp 412 and the stream offset 414 are determined, the time report information aggregation component 408 updates the data structure 416 with the minimum timestamp 412 and the stream offset 414. The data structure 416 allows readers, such as the one or more reading systems $418_1, 418_2, \ldots, 418_n$, to determine the position and time information for events in the stream by reading from the data structure 416. For instance, the one or more reading systems $418_1, 418_2, \ldots, 418_n$ can use the minimum timestamp and stream offset to determine whether no more new events received by the system 400 will arrive from an unrepresented time period, e.g., by using a temporal function that is associated with a process applied to a specified group of the events written thus far. Also as mentioned, the system 400 can receive an update to the stream, which can be, e.g., an addition of a segment or a removal of a segment. In one or more embodiments, the temporal function can evaluate to a Boolean value that uses a timestamp window that can be represented by an upperbound value and a lowerbound value. In one or embodiments, the upperbound value and the lowerbound value can be stored in the data structure 416.

Figure 5:
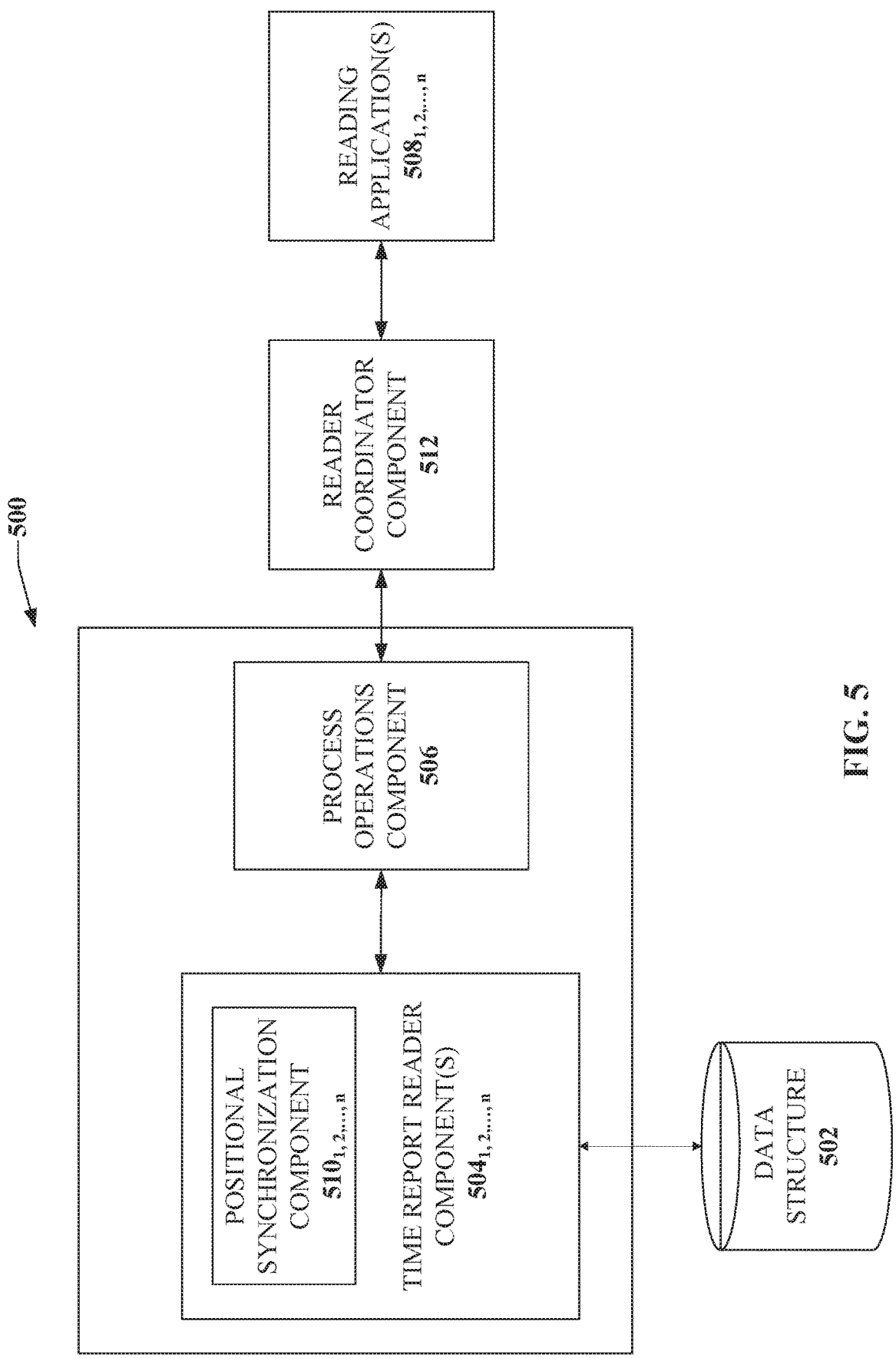
FIG. 5 illustrates a block diagram of an example, non-limiting system facilitating coordinating multiple readers to read events within a designated timeframe in parallel in accordance with one or more embodiments described herein.

FIG. 5 illustrates a non-limiting, example system 500 for reading over events written a stream using aggregated time report information from a data structure 502 determined by a time report information aggregation system. The system 500 can comprise one or more time report reader components $504_1, 504_2, \ldots, 504_n$, which can comprise one or more positional synchronization components $510_1, 510_2, \ldots, 510_n$. In one or more embodiments, the system 500 can comprise a process operations component 506 that determines groups of events to provide to one or more reading applications $508_1, 508_2, \ldots, 508_n$, via a reader coordinator component 512, based on the aggregated time report and criteria specified by the reader coordinator component 512 that coordinates the reading operations of the one or more reading applications $508_1, 508_2, \ldots, 508_n$.

Still referring to FIG. 5, the one or more time report reader components $504_1, 504_2, \ldots, 504_n$ access the data structure 502 to read a minimum timestamp and a stream offset for events written thus far. In an embodiment, the data structure 502 can be the same as or similar to data structure 108 of FIG. 1, or data structure 416 of FIG. 4. As mentioned, the data structure 502 can be created to store the minimum timestamp and the stream offset that is based on aggregation of time report information relating to events written to a stream storage system thus far by a group of writers.

A group of readers can coordinate with one another to determine respective positions of respective readers relative to the minimum timestamp and the stream offset. The one or more positional synchronization components $510_1, 510_2, \ldots, 510_n$ can be utilized by readers to agree on who is reading what data. Optionally, in stream storage systems with support for segments, the one or more positional synchronization components $510_1, 510_2, \ldots, 510_n$ can use the segments of the stream to provide a synchronization mechanism for a state shared between multiple processes running in a cluster, improving processes such as building distributed applications. With the one or more positional synchronization components $510_1, 510_2, \ldots, 510_n$, an application developer can use a platform to read and make changes to shared state consistently and perform optimistic locking. The one or more positional synchronization components $510_1, 510_2, \ldots, 510_n$ can be also used to maintain a single, shared copy of an application's configuration property across all instances of that application in a cloud, and can manage the state of reader groups and distribution of readers throughout the network. Another benefit of the one or more positional synchronization components $510_1, 510_2, \ldots, 510_n$ is that the one or more positional synchronization components $510_1, 510_2, \ldots, 510_n$ can be compacted by compressing and removing older updates while retaining only the most recent version of the state in the stream, so that the shared state does not grow unchecked.

Still referring to FIG. 5, once the one or more time report reader components $504_1, 504_2, \ldots, 504_n$ receive the minimum timestamp and the stream offset, the minimum timestamp and the stream offset are sent to a process operations component 506 where the process operations component 506 can make a determination as to whether or not any more new events received by the stream storage system will arrive in a future time period relative to a temporal function. To make this determination, the temporal function is considered relative to the minimum guarantees of the aggregated time report information to determine if all events that will apply to the temporal function have been written by the various writers of the system yet.

For example, the temporal function can be a time window that provides a search range over which a desired group of events may be spread on the stream. The time window can comprise an upperbound value and a lowerbound value in which events between those values are viewable by readers. With this information, readers can assume that events below the lowerbound value have been read and accounted for. In one embodiment, the upperbound value can comprise a timestamp that is greater than or equal to any respective timestamp that was reported by a respective writer prior to a current timestamp respectively associated with the current stream offset. In one embodiment, the lowerbound value can comprise a timestamp that is less than or equal to the current timestamp reported by the most recent respective writer at the current stream offset. In one or more embodiments, the data structure 502 can store the upperbound value and the lowerbound value.

An advantage of this concept is that this establishes a point at which all events below the established point have been processed, since data is being processed on multiple hosts in parallel. Thus, for example, the process operations component 506 can determine that new events capable of arriving in a future period of time will satisfy the temporal function. If new events that satisfy the temporal function can arrive at a future time, then the process operations component 506 will delay applying the process to the group of events to ensure the process operations component 506 has accounted for all events that satisfy the temporal function. Once the process operations component 506 has ensured that no more new events received by the stream storage system will arrive in the future time period that satisfy the temporal function.

Still referring to FIG. 5, once the group of events that satisfy the temporal function are determined, one or more reading applications $508_1, 508_2, \ldots, 508_n$ can access the group of events. In this case, the readers in a group can read from respective segments of the streams concurrently, or in parallel, and can coordinate to balance the load associated with reading the segments. This can be especially advantageous when the set of segments can change over time with dynamic scaling of segments.

Figure 6:
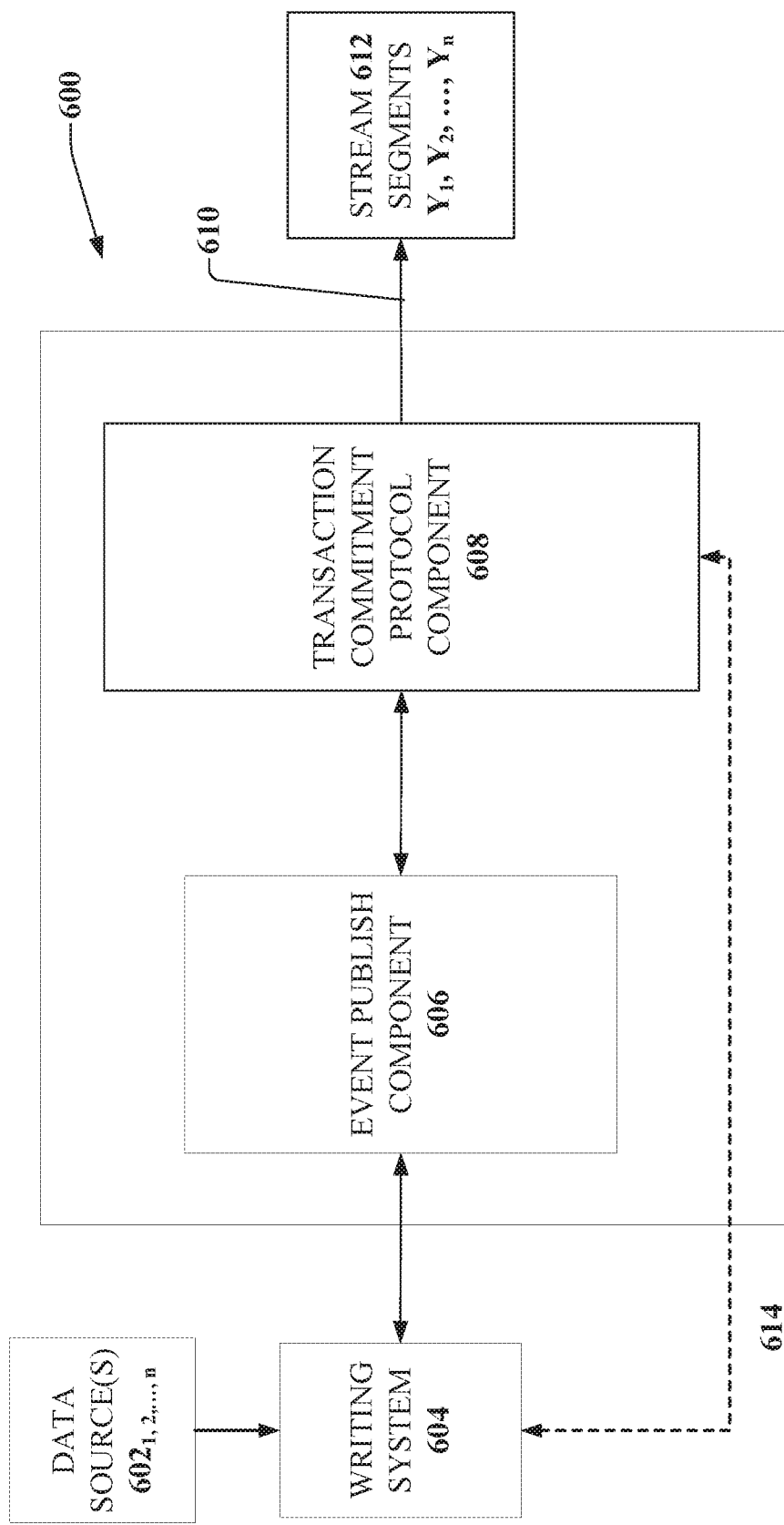
FIG. 6 illustrates a block diagram of an example, non-limiting system facilitating batching written events in a transaction and committing the transaction in accordance with one or more embodiments described herein.

FIG. 6 illustrates a non-limiting example of utilizing the system in connection with an example transaction. In addition to the ability of scaling streams according to incoming write traffic, there are also options to write sequence of events atomically. A writer can batch multiple events and commit them into a stream as a single unit. This is known as a transaction. As a writer adds an event to a transaction, the event is acknowledged back to the writer and remains durable. However, until the writer commits the transaction, any event associated with the transaction is unviewable. Once the transaction is committed, all segments in the transaction are automatically appended to their respective stream segment in the stream. If the transaction is called to abort, the transaction, all stream segments associated with the transaction, and all events published into the transaction are removed from the system. FIG. 6 depicts a system 600 communicatively connected to a writing system 604, which is communicatively connected to one or more data sources $602_1, 602_2, \ldots, 602_n$. The system 600 can comprise an event publish component 606 and a transaction commitment protocol component 608.

Still referring to FIG. 6, the writing system 604 writes events onto segments. When the writer system 604 requests to collect events as a batch, or receives them as a batch from the one or more data sources $602_1, 602_2, \ldots, 602_n$, and commit them as a single unit into a stream, the writing system 604 does so to by creation of a transaction. In such a case, where timestamps are not explicitly provided for use by the one or more data sources $602_1, 602_2, \ldots, 602_n$, the timestamps assigned to each event of the transaction can be the time of commitment, or 'commit time' of the transaction. It is noted that transactions are used more generally than the case in which the one or more data sources $602_1$, $602_2, \ldots, 602_n$ are not providing timestamps. For instance, transactions can be used with applications that want to write a groups of events to a stream atomically. Because the events only become part of the stream after they are committed, time is unable to be advanced according to the individual event times in a transaction; otherwise, the watermark contract and corresponding temporal guarantees of the aggregated time report information could be violated. Accordingly, in one embodiment, the stream storage system uses the time at commit of the transaction of events rather than note time as with an individual event.

For some additional contextual background, when the writing system 604 writes events onto the transaction, the event publish component 606 can publish the event or events, which is acknowledged back to the writing system 604. When an event is published into the transaction by the event publish component 606, the event can be routed and assigned to the same numbered stream segment. Although these transactional events exist on the transaction, for the storage system to enable the decoupling between writers and readers, the transaction has to be committed in order for readers to view any events on the transaction. To do that, the transaction commitment protocol component 608 receives a command 614 from the writing system 604 to commit the transaction or to abort the transaction. If the transaction is committed, all segments in the transaction are appended to their respective stream segments in the stream and sent for further processing and subsequent reading. If the transaction is aborted, the transaction and all its respective stream segments and published events are removed from the system. Once the transaction is committed, the committed transaction segments 610 are appended to their respective stream segments $Y_1, Y_2, \ldots, Y_n$ of stream 612.

There are instances worth noting to clarify the relationship between the writers and the stream storage system. In one or more embodiments, the writers are aware of segments if the writers are the clients of a stream storage system based on segments. In one or more embodiments, the writers are not aware of segments, such that the writers write to provide a routing key, and the stream storage system can write to segments.

Figure 7:
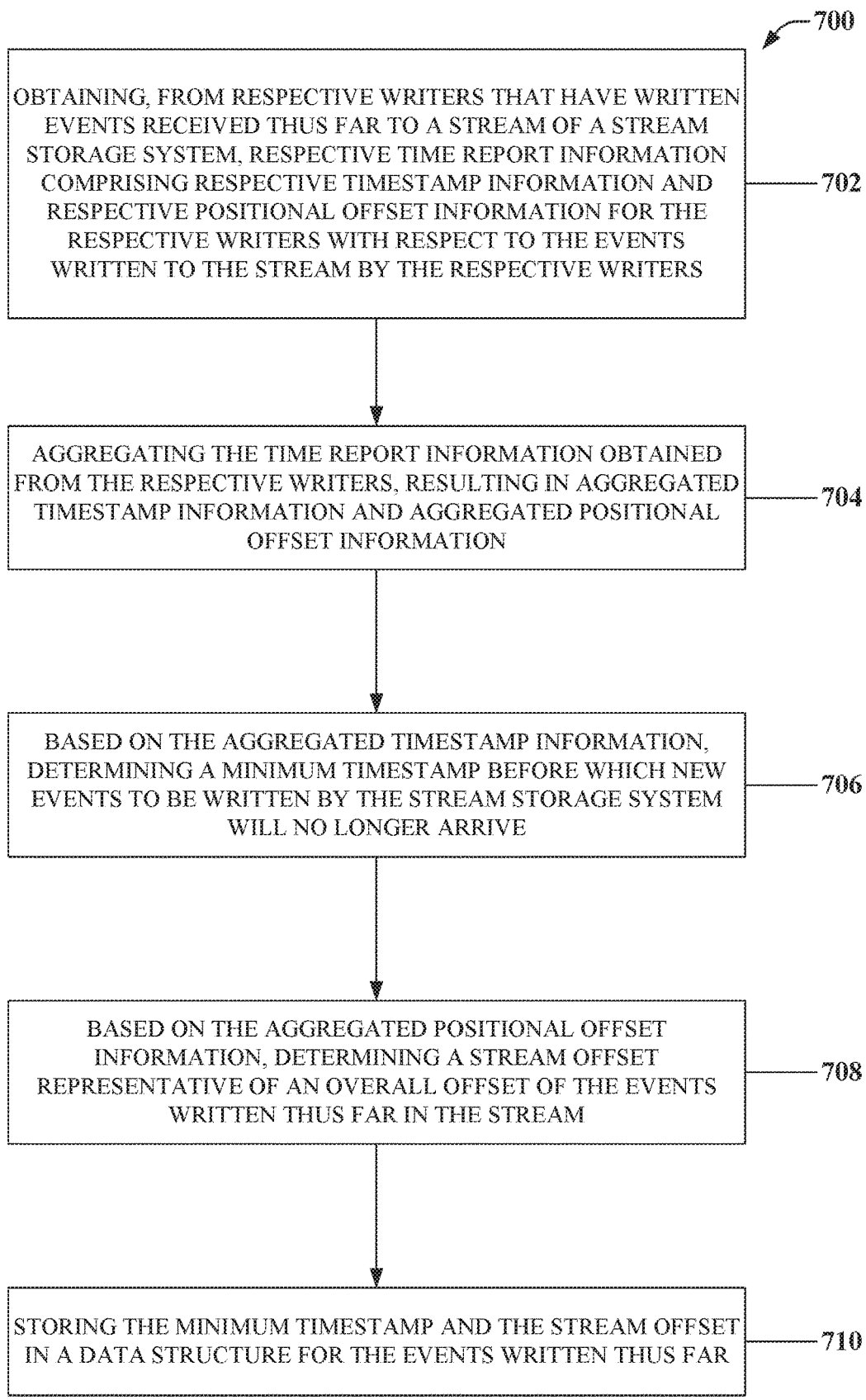
FIG. 7 illustrates an example, non-limiting method, also implementable as a system executing operations, relating to aggregating time reports of written events to a stream in accordance with one or more embodiments described therein.

FIG. 7 depicts a diagram of an example, non-limiting computer implemented method that facilitates collecting time report information from different writers of events written on streams and aggregating the time report information to produce a stream offset and a minimum timestamp. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

At 702, the method 700 can comprise obtaining, from respective writers that have written events received thus far to a stream of a stream storage system, respective time report information comprising respective timestamp information and respective positional offset information for the respective writers with respect to the events written to the stream by the respective writers. The respective timestamp information comprises respective event timestamps assigned to respective events of the events written to the stream by respective data sources originating the respective events. Further, it is noted that data source(s) originating the events received by the system are not required to add explicit timestamp information to respective events of the events. In such case, the respective timestamp information can comprise respective ingestion timestamps assigned at respective ingestion points in time that the respective events are committed to the stream by the system.

At 704, the method 700 can comprise aggregating the time report information obtained from the respective writers, resulting in aggregated timestamp information and aggregated positional offset information. The aggregating the time report information can comprise applying a timeout condition, wherein the timeout condition comprises an amount of time to wait for at least one respective writer of the respective writers to report the respective time information, and in response to the amount of time being determined to have passed, excluding the at least one respective writer of the respective writers from the aggregating the time report information until a subsequent aggregation process.

At 706, the method 700 can comprise based on the aggregated timestamp information, determining a minimum timestamp before which new events to be written by the stream storage system will no longer arrive. At 708, the method 700 can comprise based on the aggregated positional offset information, determining a stream offset representative of an overall offset of the events written thus far in the stream. At 710, the method 700 can comprise storing the minimum timestamp and the stream offset in a data structure for the events written thus far.

In various options, a stream can be composed of segments and different writers can be assigned to write to different segments or groups of segments. In such an optional implementation, the operations can further comprise locking a segment of the segments from subsequent written events being written subsequent to the events written thus far. The operations can comprise granting access to a group of reader applications to read the data structure comprising the minimum timestamp and the stream offset in a data structure for the events written thus far. In this regard, the group of reader applications are able to use the minimum timestamp and the stream offset to determine, with respect to a temporal function associated with a process to be applied to a specified group of the events, whether no more new events received by the system will arrive in the future that satisfy the temporal function. Further, the operations can comprise obtaining an update to a number of the segments, the update comprising an addition of a segment of the segments or a removal of the segment.

Figure 8:
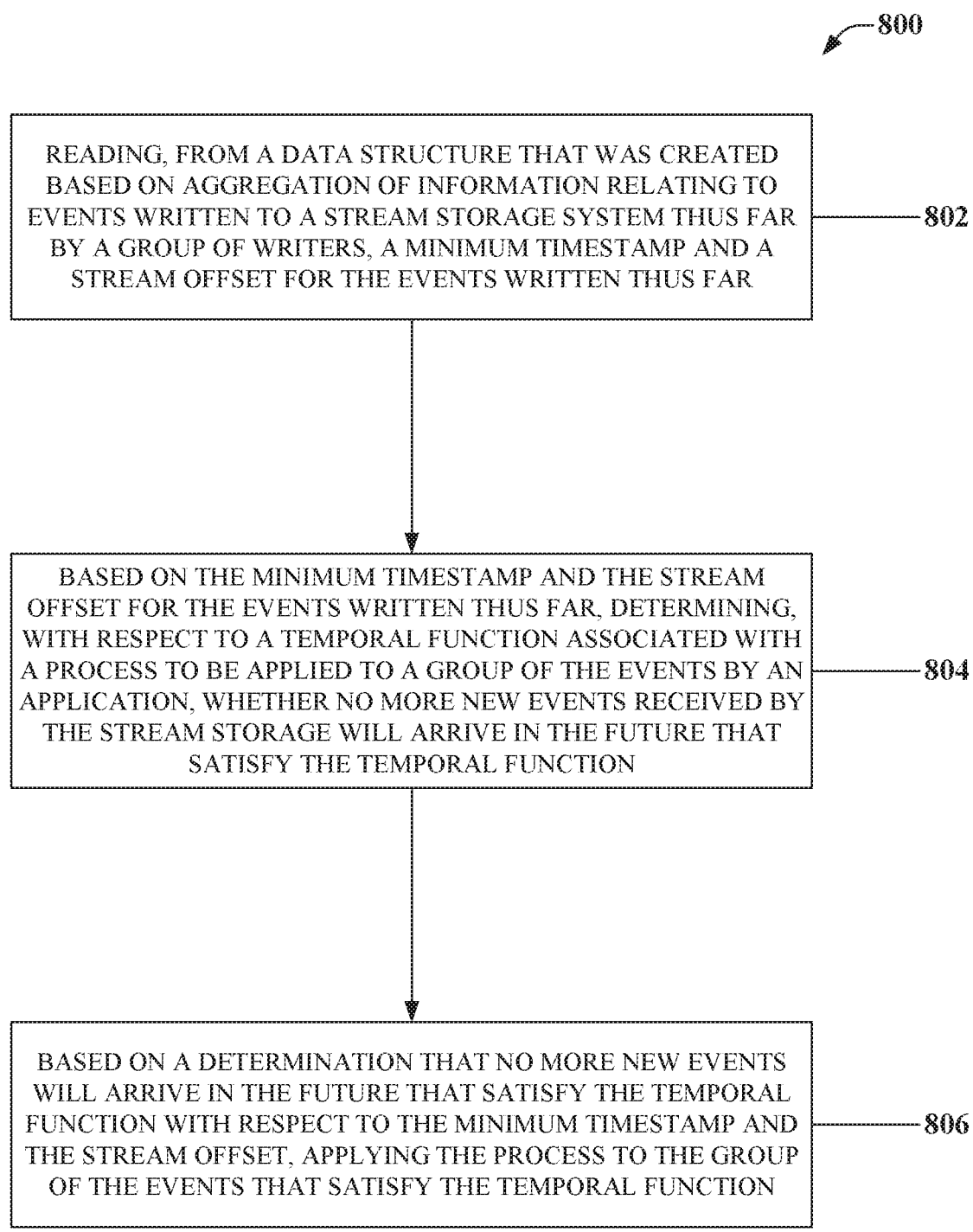
FIG. 8 illustrates an example, non-limiting method, also implementable as a system executing operations, relating to reading events within a specified timeframe in accordance with one or more embodiments described therein.

FIG. 8 depicts a diagram of an example, non-limiting computer implemented method that facilitates determining the positions of multiple readers viewing events within a specified time. In some examples, flow diagram 800 can be implemented in operating environment 1000 described below. It can be appreciated that the operations of flow diagram 800 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

At 802, the method 800 can comprise reading, from a data structure that was created based on aggregation of information relating to events written to a stream storage system thus far by a group of writers, a minimum timestamp and a stream offset for the events written thus far. The reading can comprise coordinating, by a group of readers of the system, respective positions of respective readers of the group of readers relative to the minimum timestamp and the stream offset. In various options, the coordinating the respective position can comprise utilizing a positional synchronization process.

At 804, the method 800 can comprise based on the minimum timestamp and the stream offset for the events written thus far, determining, with respect to a temporal function associated with a process to be applied to a group of the events by an application, whether no more new events received by the stream storage will arrive in the future that satisfy the temporal function. In various options, the operations can further comprise, based on a determination that no more new events will arrive in the future that satisfy the temporal function with respect to the minimum timestamp and the stream offset, delaying applying the process to the group of the events that satisfy the temporal function until further determining that no more new events received by the stream storage system will arrive in the future time that satisfy the temporal function. The temporal function associated with the process to be applied to the group of the events comprises a time window associated with the process to be applied to the group of the events.

At 806, the method 800 can comprise based on the determining indicating that no more new events will arrive in the future that satisfy the temporal function, applying the process to the group of the events that satisfy the temporal function. In various options, the operations can further comprise facilitating reading the group of the events that satisfy the temporal function in parallel.

Figure 9:
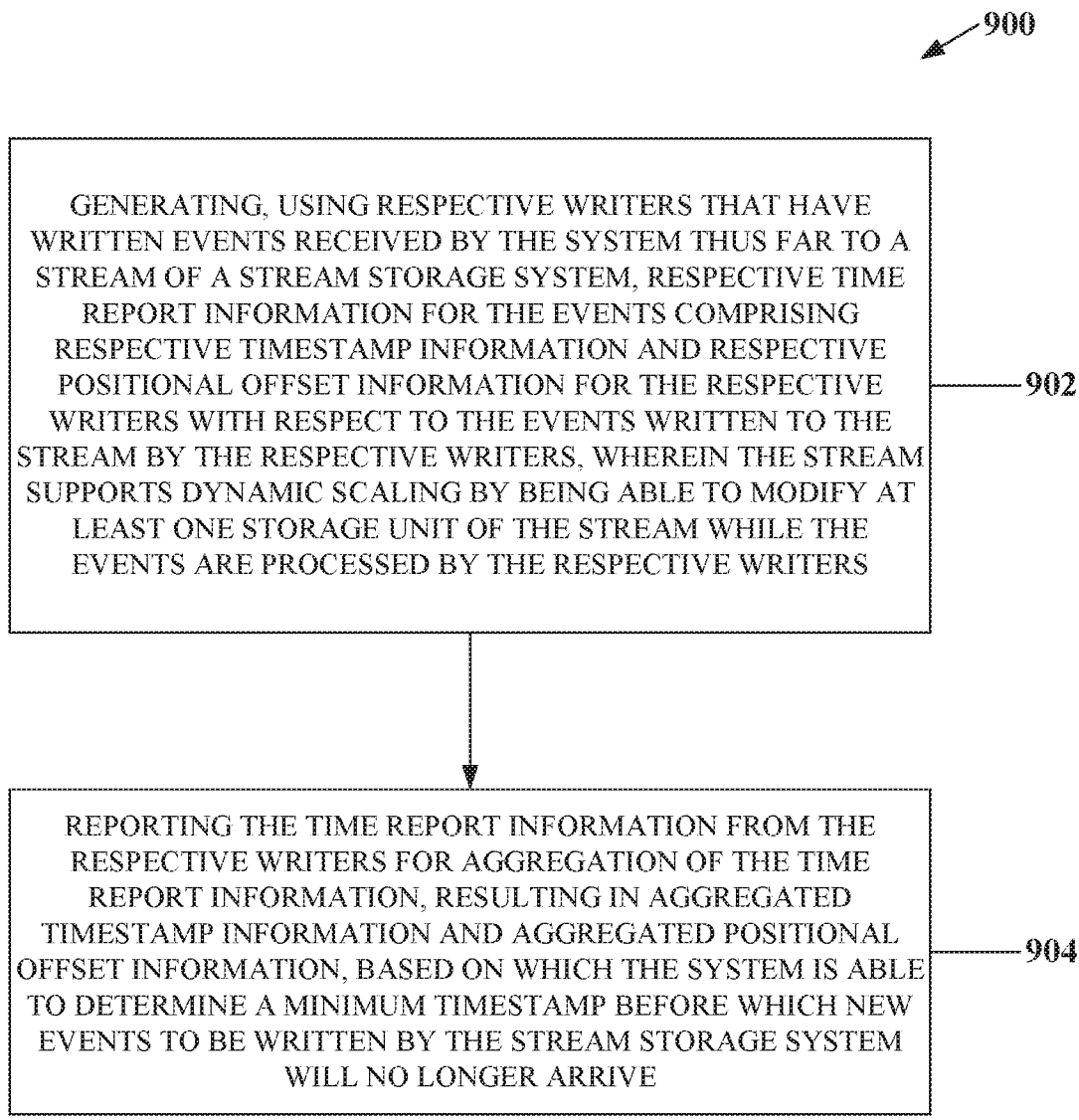
FIG. 9 illustrates an example, non-limiting method, also implementable as a system executing operations, relating to writing events to a stream and reporting respective time reports in accordance with one or more embodiments described therein.

FIG. 9 depicts a diagram of an example, non-limiting computer implemented method that facilitates reporting time progress for stream storage systems with highly event streams. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1002) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

At 902, the method 900 can comprise generating, using respective writers that have written events received by the system thus far to a stream of a stream storage system, respective time report information for the events comprising respective timestamp information and respective positional offset information for the respective writers with respect to the events written to the stream by the respective writers, wherein the stream supports dynamic scaling by being able to modify at least one storage unit of the stream while events are processed by the respective writers.

In one optional implementation, where a stream is composed of segments, a number of the segments of the stream is modifiable while the events are processed by the respective writers by at least one of increasing the number of the segments or decreasing the number of the segments. The number of segments can be modified as a function of a rate of writing events by the respective writers to the segments. In various options, the events received by the system were generated as respective items of unbounded data by different data sources at respective different times, and the events are received by the system from the different data sources independently of one another. In various options, the operations can further comprise applying a scaling criterion to the segments, which can comprise increasing the number of the segments as a function of a current rate of writing events by the respective writers to the segments exceeding a threshold rate, and wherein the number of the segments is increased by adding a segment of the segments of the stream. In additional options, the operations can further comprise applying a scaling criterion to the segments, comprising decreasing the number of segments as a function of a current rate of writing events by the respective writers to the segments being below a threshold rate, and wherein the number of the segments is decreased by removing a segment of the segments of the stream.

At 904, the method 900 can comprise reporting the respective time information to a time information aggregation platform. In various options, an event can be a transactional event, and the respective timestamp information is established in connection with committing the transactional event to a segment of the segments.

Figure 10:
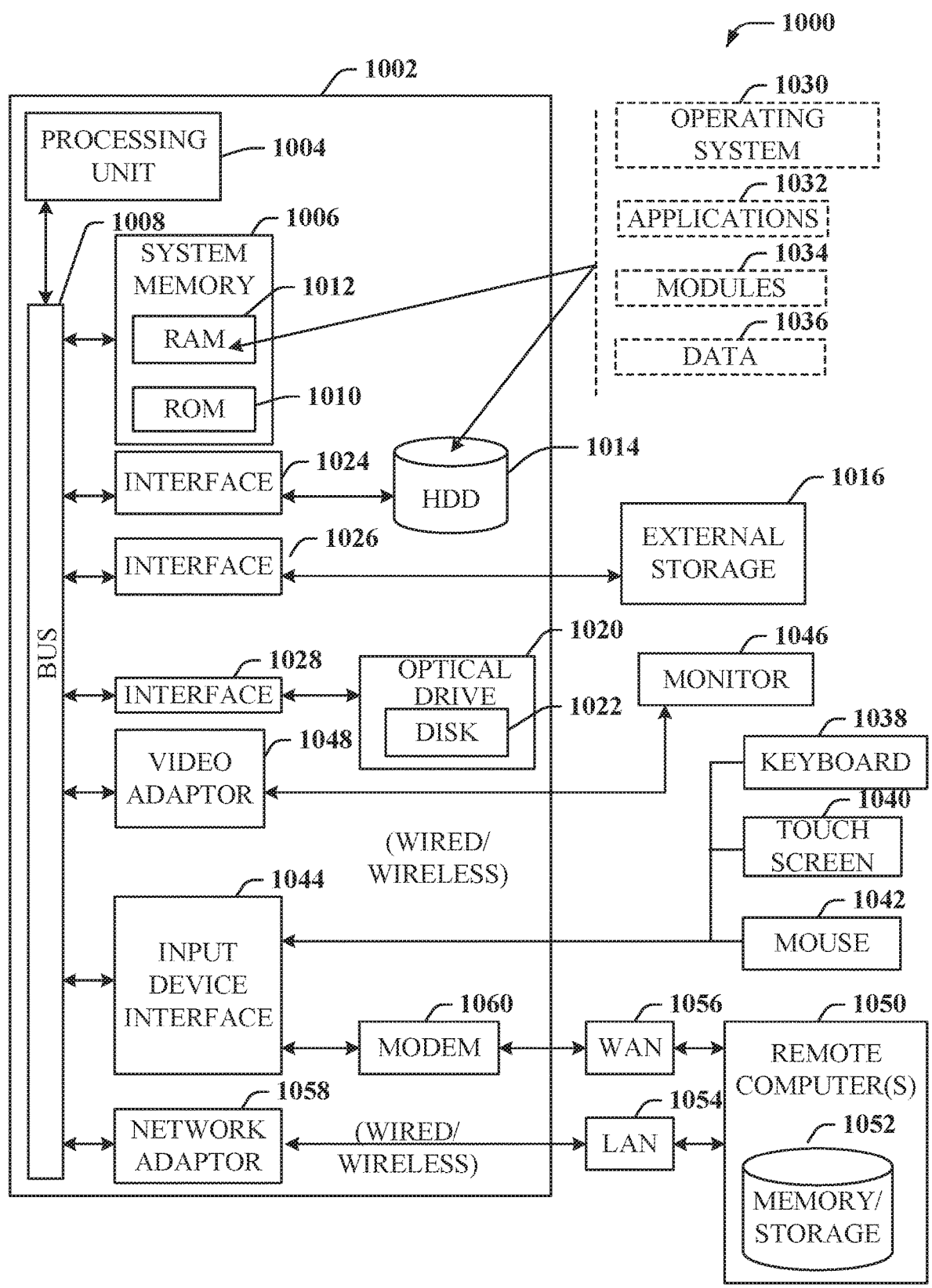
FIG. 10 illustrates a block diagram of an example, non-limiting computer environment operable to execute one or more of the various embodiments disclosed herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server and/or communication device.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from disk $1022$, including but not limited to a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
 a processor;
 a memory that stores executable instructions that, when executed by the processor, facilitate performance of operations, comprising:
  obtaining, from respective writers that have written events received thus far to a stream of a stream storage system, respective time report information comprising respective timestamp information and respective positional offset information for the respective writers with respect to the events written thus far to the stream by the respective writers;
  aggregating the time report information obtained from the respective writers, resulting in aggregated timestamp information and aggregated positional offset information;
  based on the aggregated timestamp information, determining a minimum timestamp before which new events to be written by the stream storage system will no longer arrive;
  based on the aggregated positional offset information, determining a stream offset representative of an overall offset of the events written thus far to the stream; and
  storing the minimum timestamp and the stream offset in a data structure for the events written thus far to the stream.

2. The system of claim 1, wherein the operations further comprise locking a segment of segments of the stream from subsequent written events being written subsequent to the events written thus far.

3. The system of claim 1, wherein the aggregating the time report information comprises applying a timeout condition, wherein the timeout condition comprises an amount of time $t_0$ wait for at least one respective writer of the respective writers to report the respective time information, and in response to the amount of time being determined to have passed, excluding the at least one respective writer of the respective writers from the aggregating the time report information until a subsequent aggregation process.

4. The system of claim 1, wherein the operations further comprise granting access to a group of reader applications to read the data structure comprising the minimum timestamp and the stream offset in the data structure for the events written thus far.

5. The system of claim 4, wherein the group of reader applications are able to use the minimum timestamp and the stream offset to determine, with respect to a temporal function associated with a process to be applied to a specified group of the events written thus far, whether no more new events received by the system will arrive in a future time period that satisfy the temporal function.

6. The system of claim 1, wherein the operations further comprise obtaining an update to a number of segments of the stream, the update comprising an addition of a segment of the segments or a removal of the segment.

7. The system of claim 1, wherein the respective timestamp information comprises respective event timestamps assigned to respective events of the events written to the stream by respective data sources originating the respective events.

8. The system of claim 1, wherein a data source originating the events received by the system does not add timestamp information to respective events of the events written thus far to the stream, and wherein the respective timestamp information comprises respective ingestion timestamps assigned at respective ingestion points in time that the respective events are committed to the stream by the system.

9. A system, comprising:
a processor;
a memory that stores executable instructions that, when executed by the processor, facilitate performance of operations, comprising:
reading, from a data structure that was created based on aggregation of information relating to events written to a stream storage system thus far by a group of writers, a minimum timestamp and a stream offset for the events written thus far;
based on the minimum timestamp and the stream offset for the events written thus far, determining, with respect to a temporal function associated with a process to be applied to a group of the events by an application, whether no more new events received by the stream storage system will arrive in a future time that satisfy the temporal function; and
based on a determination that no more new events will arrive in the future that satisfy the temporal function with respect to the minimum timestamp and the stream offset, applying the process to the group of the events that satisfy the temporal function.

10. The system of claim 9, wherein, based on a determination that the new events are able to arrive in the future time that satisfy the temporal function, delaying applying the process to the group of the events that satisfy the temporal function until further determining that no more new events received by the stream storage system will arrive in the future time that satisfy the temporal function.

11. The system of claim 9, wherein the temporal function associated with the process to be applied to the group of the events comprises a time window associated with the process to be applied to the group of the events.

12. The system of claim 9, wherein the operations further comprise facilitating reading the group of the events that satisfy the temporal function in parallel.

13. The system of claim 9, wherein the reading comprises coordinating, by a group of readers of the system, respective positions of respective readers of the group of readers relative to the minimum timestamp and the stream offset.

14. The system of claim 13, wherein the coordinating the respective position comprises utilizing a positional synchronization process.

15. A system, comprising:
a processor;
a memory that stores executable instructions that, when executed by the processor, facilitate performance of operations, comprising:
generating, using respective writers that have written events received by the system thus far to a stream of a stream storage system, respective time report information for the events comprising respective timestamp information and respective positional offset information for the respective writers with respect to the events written to the stream by the respective writers, wherein the stream supports dynamic scaling by being able to modify at least one storage unit of the stream while the events are processed by the respective writers; and
reporting the time report information from the respective writers for aggregation of the time report information, resulting in aggregated timestamp information and aggregated positional offset information, based on which the system is able to determine a minimum timestamp before which new events to be written by the stream storage system will no longer arrive.

16. The system of claim 15, wherein the stream supports the dynamic scaling by being able to modify a number of segments of the stream as a function of a rate of writing events by the respective writers to the segments.

17. The system of claim 16, wherein the operations further comprise applying a scaling criterion to the segments, comprising increasing the number of the segments as a function of a current rate of writing events by the respective writers to the segments exceeding a threshold rate, and wherein the number of the segments is increased by adding a segment of the segments of the stream.

18. The system of claim 16, wherein the operations further comprise applying a scaling criterion to the segments, comprising decreasing the number of the segments as a function of a current rate of writing events by the respective writers to the segments being below a threshold rate, and wherein the number of the segments is decreased by removing a segment of the segments of the stream.

19. The system of claim 15, wherein the events received by the system were generated as respective items of unbounded data by different data sources at respective different times, and wherein the events are received by the system from the different data sources independently of one another.

20. The system of claim 15, wherein an event of the events is a transactional event, and wherein the respective timestamp information is established in connection with committing the transactional event to the stream.

\* \* \* \* \*